United States Patent
Kamiguchi et al.

(10) Patent No.: US 11,886,855 B2
(45) Date of Patent: Jan. 30, 2024

(54) PROCESSING APPARATUS AND PROCESSING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shogo Kamiguchi, Yokkaichi (JP); Masayuki Inoue, Yokkaichi (JP); Hiroshi Tateishi, Yokkaichi (JP); Shinichi Aiba, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 814 days.

(21) Appl. No.: 16/978,144

(22) PCT Filed: Feb. 20, 2019

(86) PCT No.: PCT/JP2019/006399
§ 371 (c)(1),
(2) Date: Sep. 3, 2020

(87) PCT Pub. No.: WO2019/171960
PCT Pub. Date: Sep. 12, 2019

(65) Prior Publication Data
US 2021/0096847 A1 Apr. 1, 2021

(30) Foreign Application Priority Data
Mar. 7, 2018 (JP) .................... 2018-041011

(51) Int. Cl.
*G06F 8/65* (2018.01)
*B60W 60/00* (2020.01)
*B60R 16/023* (2006.01)

(52) U.S. Cl.
CPC ............ *G06F 8/65* (2013.01); *B60R 16/0233* (2013.01); *B60R 16/0234* (2013.01);
(Continued)

(58) Field of Classification Search
None
See application file for complete search history.

(56) References Cited

U.S. PATENT DOCUMENTS 11,036,484 B2 * 6/2021 Miller .................. G06F 8/71
11,154,442 B1 * 10/2021 Dean .................. A61G 5/10
(Continued)

FOREIGN PATENT DOCUMENTS

JP    H0714707      *  2/1995
JP    2007-034815 A    2/2007
(Continued)

OTHER PUBLICATIONS

Amariei, Want New BMW Software? Don't Park on a Hill and Don't Leave the Car in the Cold, Autoevolution, Feb. 1, 2023 (Year: 2023).*

(Continued)

*Primary Examiner* — Christian Chace
*Assistant Examiner* — Scott R Jagolinzer
(74) *Attorney, Agent, or Firm* — Honigman LLP (57) ABSTRACT

A processing apparatus is a processing apparatus for a vehicle provided with a control processing unit that executes control processing for controlling an operation of an electronic device by executing a first program, and includes: an update determination unit that determines whether or not to update the first program; and a stop determination unit that
(Continued)

determines whether or not running of the vehicle is stopped if the update determination unit makes a determination to update the first program, and, if the stop determination unit determines that running of the vehicle is stopped, the control processing unit executes the control processing by executing a second program, and a data amount of the second program is smaller than a data amount of the first program.

12 Claims, 6 Drawing Sheets

(52) U.S. Cl.
CPC ....... *B60W 60/001* (2020.02); *B60W 2520/16* (2013.01); *B60W 2520/28* (2013.01)

(56) References Cited

U.S. PATENT DOCUMENTS

| | | | |
|---|---|---|---|
| 2018/0018160 A1 | 1/2018 | Teraoka et al. | |
| 2018/0118197 A1* | 5/2018 | Kim | B60W 30/06 |

FOREIGN PATENT DOCUMENTS

| | | | | | |
|---|---|---|---|---|---|
| JP | 2010-125925 | A | | 6/2010 | |
| JP | 2013-192092 | A | | 9/2013 | |
| JP | 2017-202697 | A | | 11/2017 | |
| JP | 2021105923 | | * | 7/2021 | |
| KR | 100798908 | | * | 1/2008 | |
| WO | WO-2015009222 | A1 | * | 1/2015 | ........... G01S 17/875 |

OTHER PUBLICATIONS

Machine Translation of JP2021105923 (Year: 2021).*
Machine Translation of WO2015009222 (Year: 2015).*
Machine Translation of KR100798908 (Year: 2008).*
Machine Translation of JPH0714707 (Year: 1995).*
International Search Report, Application No. PCT/JP2019/006399, dated Apr. 23, 2019. ISA/Japan Patent Office.

* cited by examiner

Regular control processing

| Instruction | Ignition switch | Speed of the vehicle | Charge amount | Processing content |
|---|---|---|---|---|
| Activation Instruction | On | Smaller than reference speed | At least reference speed | Activation signal |
| Activation Instruction | Off | At least reference amount | Smaller than reference amount | Stop signal |
| Stop Instruction | Off | At least reference amount | Smaller than reference amount | Stop signal |
| ⋮ | ⋮ | ⋮ | ⋮ | ⋮ |

Simplified control processing

| Instruction | Processing content |
|---|---|
| Activation instruction | Activation signal |
| Stop instruction | Stop signal |

PROCESSING APPARATUS AND PROCESSING METHOD

CROSS-REFERENCE TO RELATED APPLICATIONS

This application is the U.S. national stage of PCT/JP2019/006399 filed on Feb. 20, 2019, which claims priority of Japanese Patent Application No. JP 2018-041011 filed on Mar. 7, 2018, the contents of which are incorporated herein.

TECHNICAL FIELD

The present disclosure relates to a processing apparatus and a processing method.

BACKGROUND

A processing apparatus that executes processing by executing a control program (for example, see JP 2013-192092A) is mounted in vehicles. The processing apparatus described in JP 2013-192092A executes processing by executing a simplified program whose data amount is smaller than the data amount of the control program, while updating the control program. Accordingly, the processing apparatus described in JP 2013-192092A can update the control program while executing processing by executing the simplified program.

The processing apparatus described in JP 2013-192092A switches a program that is used for executing processing from a control program to a simplified program independently from the running state of a vehicle. Therefore, there is the possibility that a switch from processing that is based on the control program to processing that is based on the simplified program is not made smoothly.

The present disclosure has been made in light of the above-described circumstances, and aims to provide a processing apparatus and a processing method in which a program that is used for executing processing is switched at an appropriate timing.

Advantageous Effects of Disclosure

According to the present disclosure, a program that is used for executing processing is switched at an appropriate timing.

SUMMARY

A processing apparatus according to one aspect of the present disclosure is a processing apparatus for a vehicle provided with a control processing unit that executes control processing for controlling an operation of an electronic device by executing a first program, and includes: an update determination unit that determines whether or not to update the first program; and a stop determination unit that determines whether or not running of the vehicle is stopped if the update determination unit makes a determination to update the first program, and, if the stop determination unit determines that running of the vehicle is stopped, the control processing unit executes the control processing by executing a second program, and a data amount of the second program is smaller than a data amount of the first program.

A processing method according to another aspect of the present disclosure includes: a step of executing control processing for controlling an operation of an electronic device by executing a first program; a step of determining whether or not to update the first program; a step of determining whether or not running of a vehicle is stopped if a determination is made to update the first program; and a step of executing the control processing by executing a second program whose data amount is smaller than a data amount of the first program if it is determined that running of the vehicle is stopped.

Note that the present disclosure can be realized as not only a processing apparatus that includes such a characteristic processing unit, but also a processing method that includes a step of such characteristic processing. The present disclosure can also be realized as a semiconductor integrated circuit that realizes a portion or the entirety of the processing apparatus, or a processing system that includes the processing apparatus.

Advantageous Effects of Disclosure

According to the present disclosure, a program that is used for executing processing is switched at an appropriate timing.

DETAILED DESCRIPTION OF PREFERRED EMBODIMENTS

First, embodiments of the present disclosure will be listed and described. At least a portion of the embodiments below may be suitably combined.

A processing apparatus according to one aspect of the present disclosure is a processing apparatus for a vehicle provided with a control processing unit that executes control processing for controlling an operation of an electronic device by executing a first program, and includes: an update determination unit that determines whether or not to update the first program; and a stop determination unit that determines whether or not running of the vehicle is stopped if the update determination unit makes a determination to update the first program, and, if the stop determination unit determines that running of the vehicle is stopped, the control processing unit executes the control processing by executing a second program, and a data amount of the second program is smaller than a data amount of the first program.

The processing apparatus according to another aspect of the present disclosure includes an update processing unit that, if the stop determination unit determines that running of the vehicle is stopped, executes update processing for updating the first program by executing the second program.

In the processing apparatus according to another aspect of the present disclosure, the control processing unit executes the control processing that is based on N types of information (where N is an integer of at least 2) by executing the first program, and executes the control processing that is based on M types of information (where M is a natural number smaller than N) that are a subset of the N types of information by executing the second program.

The processing apparatus according to another aspect of the present disclosure includes a charge amount determination unit that, if the update determination unit makes a determination to update the first program, determines whether or not a charge amount of a battery mounted in the vehicle is at least a predetermined amount, and, if the stop determination unit determines that running of the vehicle is stopped, and the charge amount determination unit determines that the charge amount is at least the predetermined amount, the control processing unit executes the control processing by executing the second program.

The processing apparatus according to another aspect of the present disclosure includes an angle determination unit that, if the update determination unit makes a determination to update the first program, determines whether or not a tilt angle formed by a travel direction of the vehicle and a horizontal plane is at least a predetermined value, and, if the stop determination unit determines that running of the vehicle is stopped, and the angle determination unit determines that the tilt angle is at least the predetermined value, the control processing unit executes the control processing by executing the second program.

The processing apparatus according to another aspect of the present disclosure includes: a completion determination unit that determines whether or not an update of the first program is complete; and a second stop determination unit that, if the completion determination unit determines that the update is complete, determines whether or not running of the vehicle is stopped, and, if the second stop determination unit determines that running of the vehicle is stopped, the control processing unit executes the control processing by executing the updated first program.

A processing method according to another aspect of the present disclosure includes: a step of executing control processing for controlling an operation of an electronic device by executing a first program; a step of determining whether or not to update the first program; a step of determining whether or not running of a vehicle is stopped if a determination is made to update the first program; and a step of executing the control processing by executing a second program whose data amount is smaller than a data amount of the first program if it is determined that running of the vehicle is stopped.

In the above-described processing apparatus and processing method according to the aspects, when updating the first program, a program that is used for executing the control processing is switched from the first program to the second program when running of the vehicle is stopped. When running of the vehicle is stopped, it is highly likely that the operation of the electronic device is stable. Therefore, the program that is used for executing the control processing is switched to the second program at an appropriate timing.

In the processing apparatus according to another aspect, control processing and update processing are executed by executing the second program.

In the processing apparatus according to the above aspect, the number of types of information that are used in control processing of the second program is smaller than the number of types of information that are used for control processing of the first program. Accordingly, the first program whose data amount is smaller than the data amount of the second program is realized.

In the processing apparatus according to the above aspect, when updating the first program, a program that is used for executing processing is switched from the first program to the second program when running of the vehicle is stopped, and the charge amount of the battery is at least a predetermined amount. When running of the vehicle is stopped, and the charge amount of the battery is at least the predetermined amount, it is more likely that the operation of the electronic device is stable. Therefore, the program used for executing processing is switched to the second program at a more appropriate timing.

In the above processing apparatus according to another aspect, when updating the first program, the program that is used for executing processing is switched from the first program to the second program when running of the vehicle is stopped, and the tilt angle of the vehicle relative to a horizontal plane is at least a predetermined value. When running of the vehicle is stopped, and the tilt angle of the vehicle relative to a horizontal plane is at least the predetermined value, it is more likely that the operation of the electronic device is stable. Therefore, the program that is used for executing processing is switched to the second program at a more appropriate timing.

In the above processing apparatus according to another aspect, when update of the first program is complete, the program that is used for executing processing is switched from the second program to the updated first program when the vehicle is stopped running. When the vehicle is stopped running, it is likely that the operation of the electronic device is stable. Therefore, the program that is used for executing processing is switched to the updated first program at an appropriate timing.

Specific examples of a communication system according to an embodiment of the present disclosure will be described below with reference to the drawings. Note that the present disclosure is not limited to illustrations of these, but is indicated by the claims, and is intended to include all modifications that are within the meanings and the scope that are equivalent to those of the claims.

Figure 1:
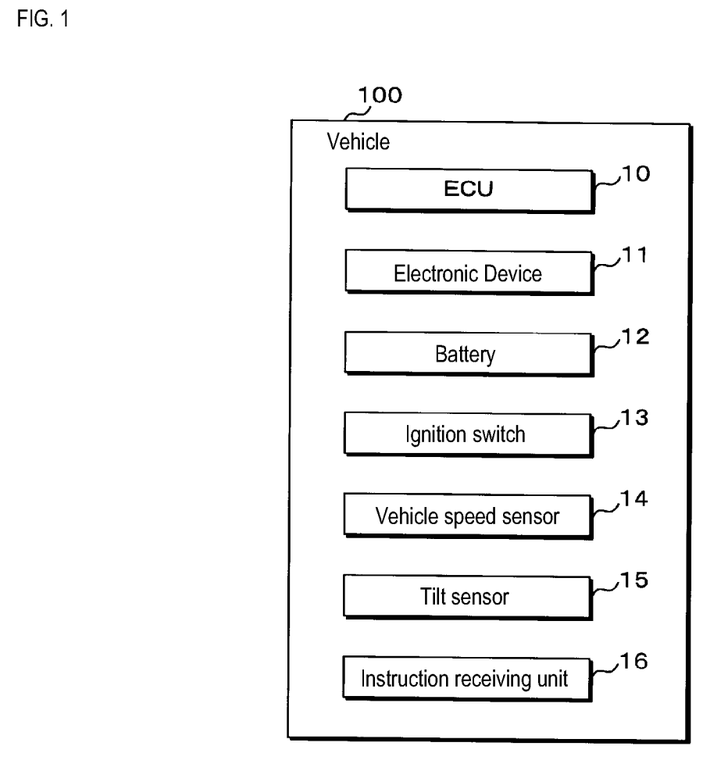
FIG. 1 is a block diagram showing a schematic configuration of a vehicle according to an embodiment of the present disclosure.

FIG. 1 is a block diagram showing a schematic configuration of a vehicle 100 according to this embodiment. An ECU (electronic control unit) 10, an electronic device 11, a battery 12, an ignition switch 13, a vehicle speed sensor 14, a tilt sensor 15, and an instruction receiving unit 16 are mounted in the vehicle 100.

The ECU 10 outputs, to the electronic device 11, an activation signal that instructs activation and a stop signal that instructs activation stop. The electronic device 11 is a motor, a lamp, or the like. The electronic device 11 is activated when the activation signal is input, and stops operating when the stop signal is input. The battery 12 is charged by an electrical generator (not illustrated), and supplies power to the ECU 10, the electronic device 11, the vehicle speed sensor 14, the tilt sensor 15, and the like.

The ignition switch 13 is a switch that is switched on when starting an engine mounted in the vehicle 100. When the ignition switch 13 is on, the engine is activated. When the ignition switch 13 is off, the operation of the engine is stopped.

The vehicle speed sensor 14 detects the speed of the vehicle 100. The vehicle speed sensor 14 periodically outputs vehicle speed information indicating the speed of the vehicle 100 to the ECU 10.

Figure 2:
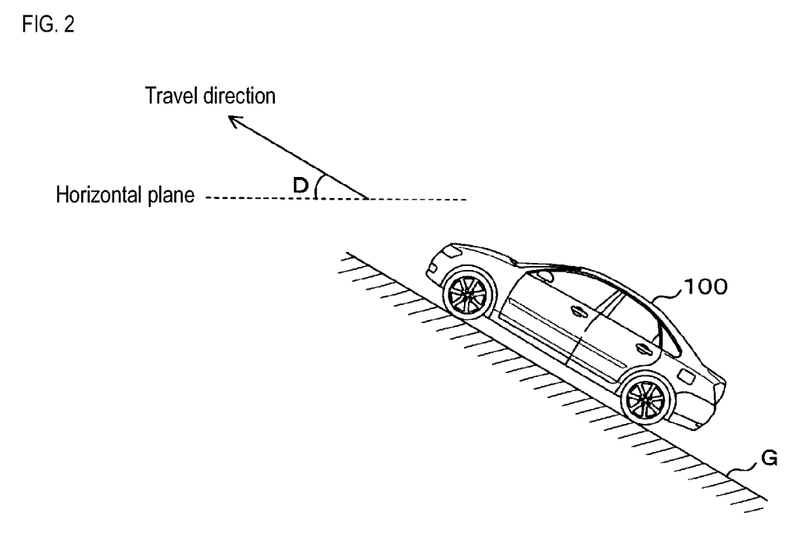
FIG. 2 is a diagram illustrating a tilt angle.

The tilt sensor 15 detects a tilt angle formed by the travel direction of the vehicle 100 and a horizontal plane. FIG. 2 is a diagram illustrating a tilt angle. The illustration is based on the assumption that the vehicle 100 is running on the ground G. As shown in FIG. 2, a tilt angle D is an angle formed by the travel direction of the vehicle 100 and a horizontal plane, when viewed from the right side or left side of the vehicle 100. The tilt sensor 15 detects the tilt angle D based on an angle formed by the direction of the acceleration rate of the vehicle 100 and the direction of the acceleration rate of gravity, for example. The tilt sensor 15 periodically outputs tilt angle information indicating the tilt angle D to the ECU 10.

The instruction receiving unit 16 receives, from a passenger of the vehicle 100, an activation instruction instructing that the electronic device 11 be activated and a stop instruction instructing that the operation of the electronic device 11 be stopped. Every time an instruction to activate or stop the electronic device 11 is received, the instruction receiving unit 16 outputs instruction information indicating the received instruction, to the ECU 10.

Figure 3:
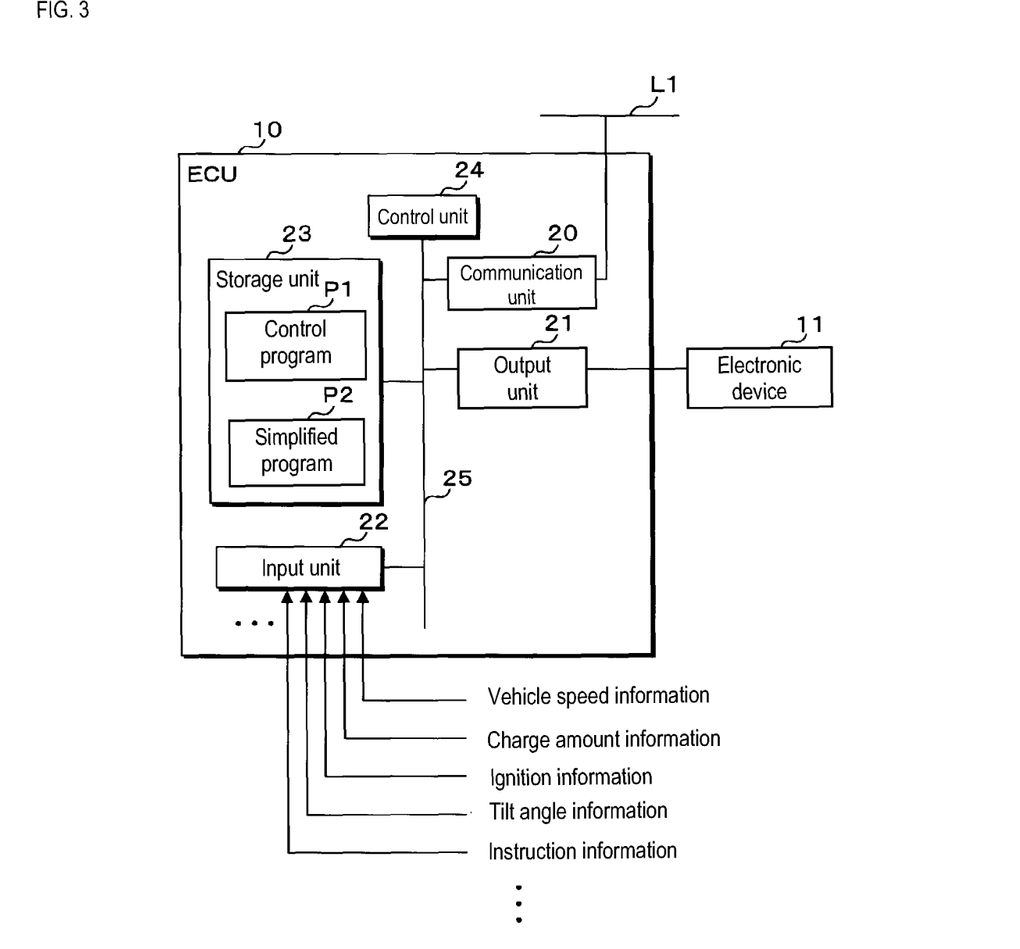
FIG. 3 is a block diagram showing main constituent elements of an ECU.

FIG. 3 is a block diagram showing main constituent elements of the ECU 10. The ECU 10 includes a communication unit 20, an output unit 21, an input unit 22, a storage unit 23, and a control unit 24. These are connected to an internal bus 25. The communication unit 20 is connected to a communication bus L1 besides the internal bus 25. The output unit 21 is connected to the electronic device 11 besides the internal bus 25. Also other apparatuses (not illustrated) mounted in the vehicle 100 are connected to the communication bus L1, besides the ECU 10.

The communication unit 20 receives data from apparatuses other than the ECU 10 via the communication bus L1.

The output unit 21 outputs the activation signal and the stop signal to the electronic device 11 in accordance with an instruction from the control unit 24. As described above, the electronic device 11 is activated when the activation signal is input, and stops operating when the stop signal is input.

The vehicle speed sensor 14 periodically outputs vehicle speed information indicating a detected speed of the vehicle 100, to the input unit 22. The tilt sensor 15 periodically outputs tilt angle information indicating a detected tilt angle, to the input unit 22. Every time an activation instruction or a stop instruction is received, the instruction receiving unit 16 outputs instruction information indicating the received instruction, to the input unit 22.

In addition, ignition information indicating whether or not the ignition switch 13 is on is periodically input to the input unit 22. Charge amount information indicating the charge amount that is accumulated in the battery 12 is also periodically input to the input unit 22. The vehicle speed information, the charge amount information, the ignition information, the tilt angle information, and the instruction information input to the input unit 22 are obtained from the input unit 22 by the control unit 24.

Information other than the vehicle speed information, the charge amount information, the ignition information, the tilt angle information, and the instruction information is also input to the input unit 22. This information is also obtained from the input unit 22 by the control unit 24.

The storage unit 23 is a non-volatile memory. A control program P1 and a simplified program P2 are stored in the storage unit 23. The control unit 24 includes one or more CPUs (central processing units). The one or more CPUs of the control unit 24 execute regular control processing and simplified program execution processing by executing the control program P1. The regular control processing is processing for controlling the operation of the electronic device 11.

The simplified program execution processing is processing for switching a program that is used for controlling the operation of the electronic device 11 to a simplified program. The control program P1 is a computer program for executing the regular control processing and the simplified program.

The one or more CPUs of the control unit 24 execute simplified control processing, control program update processing, and control program execution processing by executing the simplified program P2. The simplified control processing is processing for controlling the operation of the electronic device 11. The control program update processing is processing for updating the control program P1. The control program execution processing is processing for switching a program that is used for controlling the operation of the electronic device 11 to a control program.

The control program P1 is updated. Update data for updating the control program P1 is transmitted to the communication unit 20 via the communication bus L1. Specifically, a plurality of data chunks that constitute the update data are transmitted to the communication unit 20. Upon receiving the data chunks, the communication unit 20 stores the received data chunks to the storage unit 23.

For example, a wireless apparatus that wirelessly communicates with a server installed outside of the vehicle 100 is connected to the communication bus L1. The wireless apparatus receives update data from the server, and individually transmits a plurality of data chunks that constitute the received update data, via the communication bus L1. The communication unit 20 receives the data chunks transmitted by the wireless apparatus via the communication bus L1, and stores the received data chunks to the storage unit 23.

The simplified program P2 is a program that is not updated, and based on which improper processing is unlikely to be executed by the control unit 24. The data amount of the simplified program P2 is kept small, and is smaller than the data amount of the control program P1.

The ECU 10 and the control unit 24 respectively function as a processing apparatus and a control processing unit. The control program P1 and the simplified program P2 are respectively equivalent to a first program and a second program.

Figure 4:
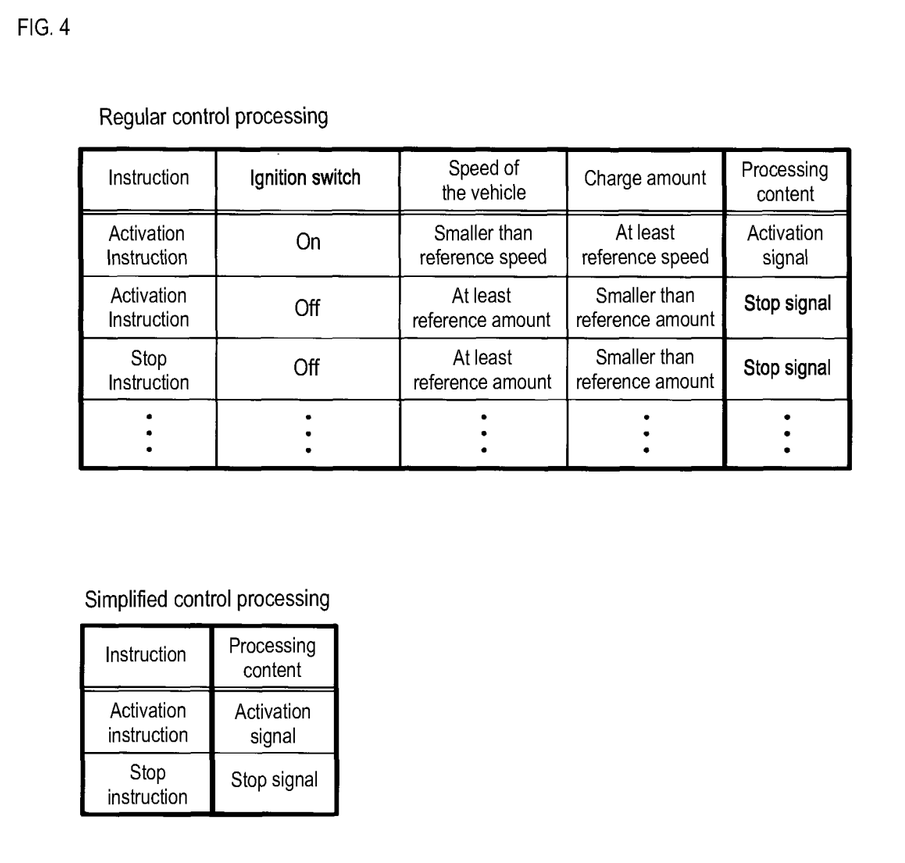
FIG. 4 is a diagram illustrating regular control processing and simplified control processing.

FIG. 4 is a diagram illustrating the regular control processing and the simplified control processing. As described above, the control unit 24 executes the regular control processing by executing the control program P1. The regular control processing is executed during most of a period except for an update period during which the control program P1 is updated. As shown in FIG. 4, in the regular control processing, the control unit 24 determines the processing content, namely a signal that is to be output by the output unit 21 from among the activation signal and the stop signal, based on N types of information (where N is an integer of at least 2) input to the input unit 22. Therefore, the regular control processing is control processing for controlling the operation of the electronic device 11 based on N types of information.

In the example in FIG. 4, N is 4, and the N types of information are instruction information, ignition information, vehicle speed information, and charge amount information. In this case, the control unit 24 determines a signal that is to be output by the output unit 21, based on an instruction received by the instruction receiving unit 16, whether or not the ignition switch 13 is on, whether or not the speed of the vehicle 100 detected by the vehicle speed sensor 14 is at least a reference speed, and whether or not the charge amount of the battery 12 is at least a reference amount. The control unit 24 instructs the output unit 21 to output the determined signal. The electronic device 11 performs an operation that is based on the signal output by the output unit 21.

In addition, as described above, the control unit 24 executes the simplified control processing by executing the simplified program P2. The simplified control processing is executed during the update period during which the control program P1 is updated. As shown in FIG. 4, in the simplified control processing, the control unit 24 determines the processing content, based on M types of information (where M is a natural number smaller than N) input to the input unit 22. Therefore, the simplified control processing is control processing for controlling the operation of the electronic device 11 based on M types of information. The M types of information are a subset of the N types of information.

In the example in FIG. 4, M is 1, and the M types of information are instruction information. In this case, the control unit 24 determines a signal that is to be output by the output unit 21, based only on an instruction received by the instruction receiving unit 16. The control unit 24 instructs the output unit 21 to output the determined signal. The electronic device 11 performs an operation that is based on the signal output by the output unit 21.

As described above, the number of types of information used for the simplified control processing of the simplified program P2 is smaller than the number of types of information used for the regular control processing of the control program P1. Accordingly, a simplified program P2 is realized whose data amount is smaller than the data amount of the control program P1.

The instruction information is received information regarding content received from the outside. The ignition switch information and the vehicle speed information are both running information regarding running of the vehicle 100. The charge amount information is electricity storage information regarding an electricity storage mounted in the vehicle 100. The electricity storage may be the battery 12, or may also be different from the battery 12. The N types of information may include device information regarding electronic devices such as door mirrors, wipers, or the like mounted in the vehicle 100. It suffices for the N types of information to include at least one of received information, running information, electricity storage information, and device information. For example, the N types of information may be two types of received information.

Figure 5:
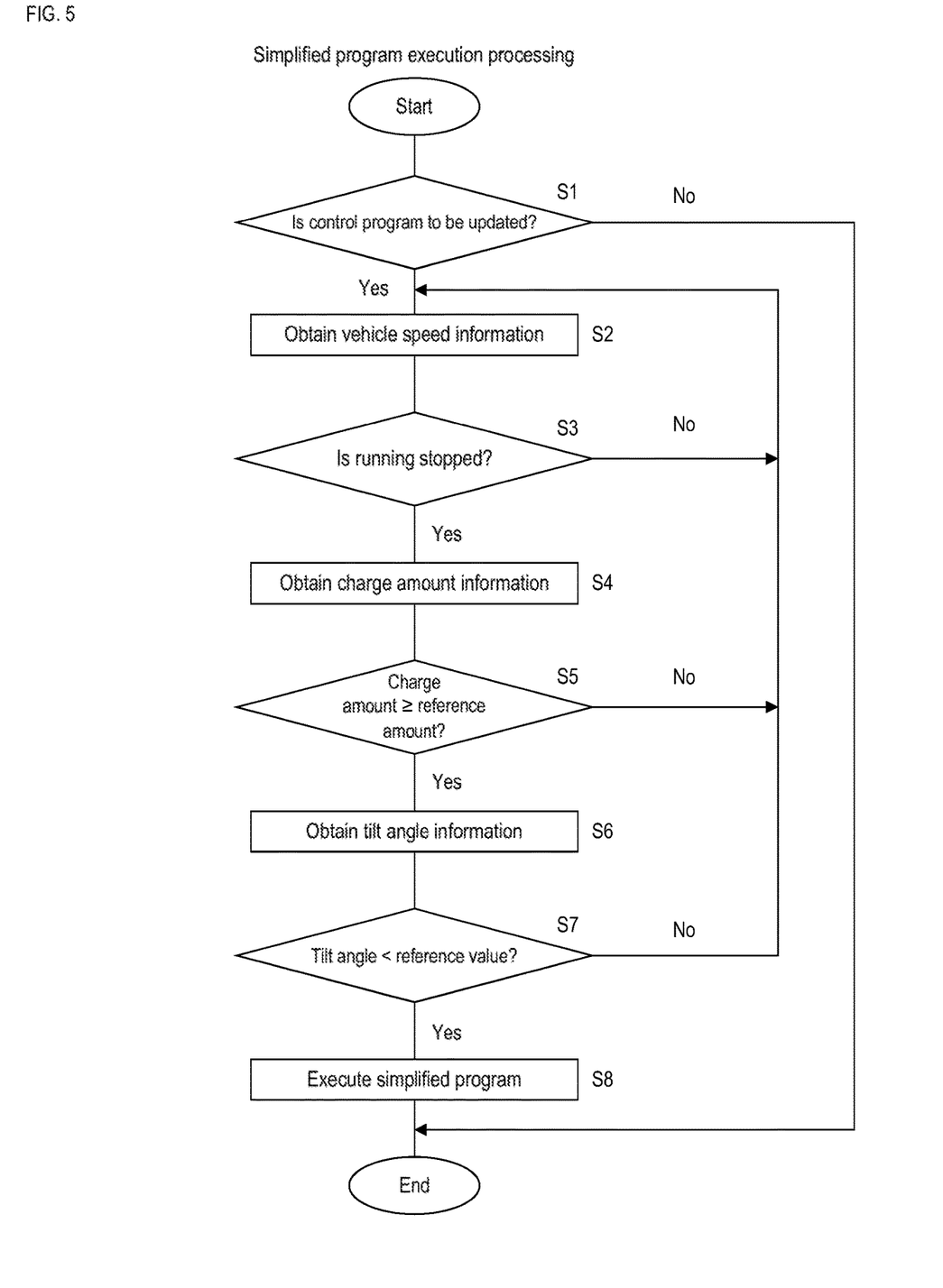
FIG. 5 is a flowchart showing a procedure of simplified program execution processing.

FIG. 5 is a flowchart showing a procedure of the simplified program execution processing. The control unit 24 periodically executes the simplified program execution processing by executing the control program P1 when the ignition switch 13 is on. The control unit 24 executes the regular control processing and the simplified program execution processing in parallel using a time division method.

First, the control unit 24 determines whether or not to update the control program P1 (step S1). In step S1, as an example, if update data is stored in the storage unit 23, the control unit 24 makes a determination to update the control program P1, and, if no update data is stored in the storage unit 23, makes a determination to not update the control program P1.

In addition, as another example, if at least one of a plurality of data chunks that constitute update data is stored in the storage unit 23, the control unit 24 determines that the control program P1 is to be updated, and if no data chunks are stored in the storage unit 23, determines that the control program P1 is not to be updated. The control unit 24 also functions as an update determination unit.

If a determination is made to not update the control program P1 (step S1: NO), the control unit 24 ends the simplified program execution processing. Thereafter, when the next cycle arrives, the control unit 24 executes the simplified program execution processing again.

If a determination is made to update the control program P1 (step S1: YES), the control unit 24 obtains the vehicle speed information from the input unit 22 (step S2), and determines whether or not running of the vehicle 100 is stopped, based on the speed of the vehicle 100 indicated by the obtained vehicle speed information (step S3). If the speed of the vehicle 100 is 0 in step S3, the control unit 24 determines that running of the vehicle 100 is stopped, and if the speed of the vehicle 100 exceeds 0, determines that running of the vehicle 100 is not stopped. The control unit 24 also functions as a stop determination unit.

If it is determined that running of the vehicle 100 is not stopped (step S3: NO), the control unit 24 executes step S2, and waits until the vehicle 100 stops running.

If it is determined that running of the vehicle 100 is stopped (step S3: YES), the control unit 24 obtains the charge amount information from the input unit 22 (step S4), and determines whether or not the charge amount of the battery 12 indicated by the obtained charge amount information is at least a reference amount (step S5). The reference amount is a certain amount, and is set in advance. The control unit 24 also functions as a charge amount determination unit. Note that the reference amount used in step S5 may be different from a reference amount that is used in the regular control processing.

If it is determined that the charge amount is smaller than a reference amount (step S5: NO), the control unit 24 executes step S2, and waits until the conditions that running of the vehicle 100 is stopped, and the charge amount of the battery 12 is at least the reference amount are satisfied. The battery 12 is charged by an electrical generator as described above.

If it is determined that the charge amount is at least the reference amount (step S5: YES), the control unit 24 obtains the tilt angle information from the input unit 22 (step S6), and determines whether or not the tilt angle formed by the travel direction of the vehicle 100 and a horizontal plane is smaller than a reference value (step S7). The reference value is a certain value, and is set in advance. The control unit 24 also functions as an angle determination unit.

If it is determined that the tilt angle is at least the reference value (step S7: NO), the control unit 24 executes step S2, and waits until the conditions that running of the vehicle 100 is stopped, that the charge amount of the battery 12 is at least the reference amount, and that the tilt angle of the vehicle 100 is smaller than the reference value are satisfied.

If it is determined that the tilt angle is smaller than the reference value (step S7: YES), the control unit 24 executes the simplified program P2 (step S8). As described above, the control unit 24 executes the simplified control processing, the control program update processing, and the control program execution processing by executing the simplified program P2.

After executing step S8, the control unit 24 ends the simplified program execution processing. Thereafter, the control program P1 is not executed until the control program P1 is executed in the control program execution processing.

As described above, when updating the control program P1, a program that is used for control processing for controlling the operation of the electronic device 11 is switched to the simplified program P2 when running of the vehicle 100 is stopped, the charge amount of the battery 12 is at least the reference amount, and the tilt angle of the vehicle 100 is at least the reference value.

After a switch is made from the control program P1 to the simplified program P2, the control unit 24 executes the control program update processing while executing the above-described simplified control processing. In the control program update processing, the control program P1 is updated based on update data or data chunks stored in the storage unit 23. After updating the control program P1, the control unit 24 deletes the update data or data chunks used for the update, from the storage unit 23. The control unit 24 also functions as an update processing unit.

Figure 6:
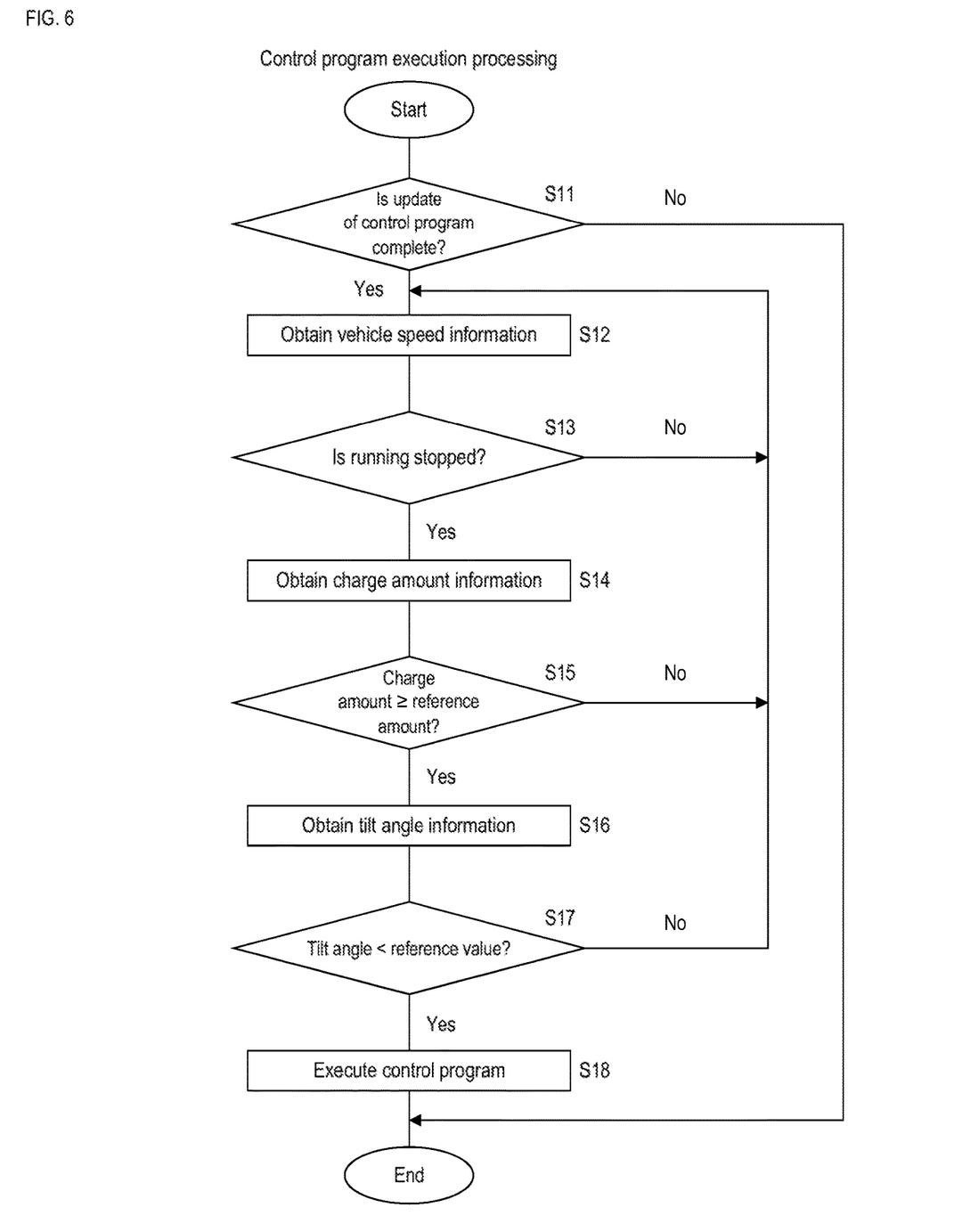
FIG. 6 is a flowchart showing a procedure of control program execution processing.

FIG. 6 is a flowchart showing a procedure of the control program execution processing. The control unit 24 executes the control program execution processing by executing the simplified program P2 when the ignition switch 13 is on. In the control program execution processing, the control unit 24 first determines whether or not the update of the control program P1 is complete (step S11). The control unit 24 also functions as a completion determination unit.

If it is determined that the update of the control program P1 is not complete (step S11: NO), the control unit 24 ends the control program execution processing. Thereafter, when the next cycle arrives, the control unit 24 executes the control program execution processing again.

If it is determined that the update of the control program P1 is complete (step S11: YES), the control unit 24 obtains the vehicle speed information from the input unit 22 (step S12), and determines whether or not running of the vehicle 100 is stopped, based on the speed of the vehicle 100 indicated by the obtained vehicle speed information, similarly to step S3 of the simplified program execution processing (step S13). The control unit 24 also functions as a second stop determination unit.

If it is determined that running of the vehicle 100 is not stopped (step S13: NO), the control unit 24 executes step S12, and waits until running of the vehicle 100 is stopped.

If it is determined that running of the vehicle 100 is stopped (step S13: YES), the control unit 24 obtains the charge amount information from the input unit 22 (step S14), and determines whether or not the charge amount of the battery 12 indicated by the obtained charge amount information is at least a reference amount (step S15). Note that the reference amount that is used in step S15 may be different from one or both of a reference amount that is used for regular control processing and the reference amount used in step S5 of the simplified program execution processing. In this case, the reference amount used in step S15 is also a certain amount, and is set in advance.

If it is determined that the charge amount is smaller than the reference amount (step S15: NO), the control unit 24 executes step S12, and waits until the conditions that running of the vehicle 100 is stopped and the charge amount of the battery 12 is at least the reference amount are satisfied. The battery 12 is charged by an electrical generator as described above.

If it is determined that the charge amount is at least the reference amount (step S15: YES), the control unit 24 obtains the tilt angle information from the input unit 22 (step S16), and determines whether or not the tilt angle formed by the travel direction of the vehicle 100 and a horizontal plane is smaller than a reference value (step S17). Note that the reference value used in step S17 may be different from the reference value used in step S7 of the simplified program execution processing. In this case, the reference value used in step S17 is also a certain amount, and is set in advance.

If it is determined that the tilt angle is at least the reference value (step S17: NO), the control unit 24 executes step S12, and waits until the conditions that running of the vehicle 100 is stopped, that the charge amount of the battery 12 is at least the reference amount, and that the tilt angle of the vehicle 100 is smaller than the reference value are satisfied.

If it is determined that the tilt angle is smaller than the reference value (step S17: YES), the control unit 24 executes the updated control program P1 (step S18). As described above, the control unit 24 executes the regular control processing and the simplified program execution processing by executing the updated control program P1.

After executing step S18, the control unit 24 ends the control program execution processing. Thereafter, in the simplified program execution processing, the simplified program P2 will not be executed.

As described above, when the update of the control program P1 is complete, the program that is used for control processing for controlling the operation of the electronic device 11 is switched to the updated control program P1 when running of the vehicle 100 is stopped, the charge amount of the battery 12 is at least the reference amount, and the tilt angle of the vehicle 100 is at least the reference value.

Figure 7:
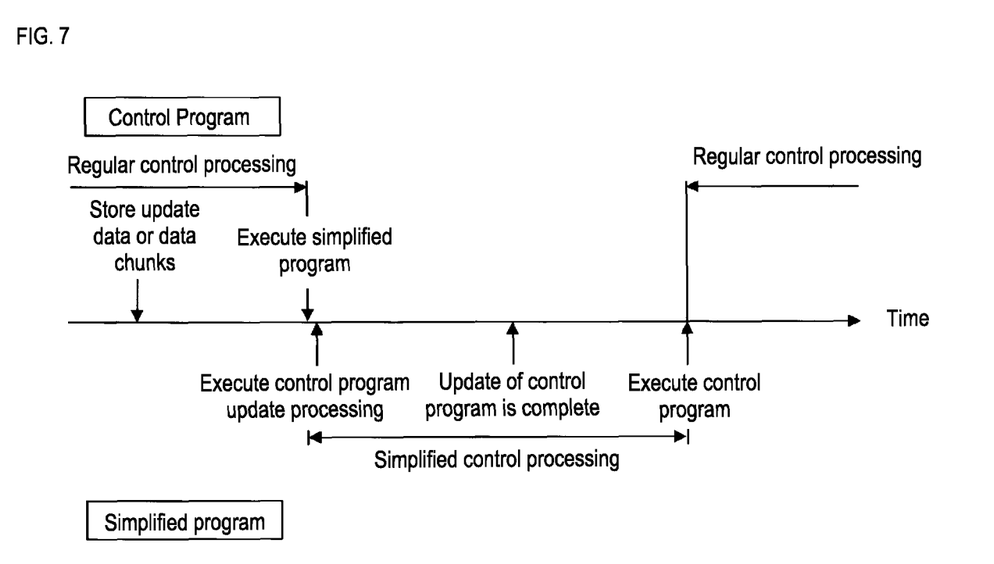
FIG. 7 is a diagram illustrating operations of an ECU.

FIG. 7 is a diagram illustrating operations of the ECU 10. FIG. 7 shows, in time series, processing that is executed by the control unit 24 by executing the control program P1, and processing that is executed by the control unit 24 by executing the simplified program P2. The processing that is executed by the control unit 24 by executing the control program P1 is indicated above the time axis. The processing that is executed by the control unit 24 by executing the simplified program P2 is indicated below the time axis.

While the control unit 24 is executing the regular control processing by executing the control program P1, the communication unit 20 receives update data or data chunks, and stores the received update data or data chunks to the storage unit 23. In the simplified program execution processing that is subsequently executed, the update data or data chunks are stored in the storage unit 23, and thus the control unit 24 makes a determination to update the control program P1. Next, in the simplified program execution processing, the control unit 24 waits until the conditions that running of the vehicle 100 is stopped, that the charge amount of the battery 12 is at least the reference amount, and that the tilt angle is at least the reference value are satisfied.

When the conditions that running of the vehicle 100 is stopped, that the charge amount of the battery 12 is at least the reference amount, and that the tilt angle is at least the reference value are satisfied, the control unit 24 executes the simplified program P2, and stops execution of the control program P1. The control unit 24 then executes the simplified control processing by executing the simplified program P2.

The control unit 24 then executes the control program update processing while executing the simplified control processing. After update of the control program P1 is complete, the control unit 24 deletes the update data or data chunks used for updating the control program P1, and executes the control program execution processing. In the control program execution processing, the control unit 24 determines that update of the control program P1 is complete, and waits until the conditions that running of the vehicle 100 is stopped, that the charge amount of the battery 12 is at least the reference amount, and that the tilt angle is at least the reference value are satisfied.

When the conditions that running of the vehicle 100 is stopped, that the charge amount of the battery 12 is at least the reference amount, and that the tilt angle is at least the reference value are satisfied, the control unit 24 executes the updated control program P1, and stops execution of the simplified program P2. The control unit 24 then executes the regular control processing again by executing the control program P1.

In the ECU 10 configured as described above, when updating the control program P1, a program that is used for executing control processing is switched from the control program P1 to the simplified program P2 when the conditions that running of the vehicle 100 is stopped, that the charge amount of the battery 12 is at least the reference amount, and that the tilt angle is at least the reference value are satisfied. When these conditions are satisfied, it is highly likely that the operation of the electronic device 11 is stable. Therefore, the program that is used for executing control processing is switched to the simplified program P2 at an appropriate timing.

In addition, when update of the control program P1 is complete, the program that is used for executing control processing is switched from the simplified program P2 to the updated control program P1 when the conditions that running of the vehicle 100 is stopped, that the charge amount of the battery 12 is at least the reference amount, and that the tilt angle is at least the reference value are satisfied. When these conditions are satisfied, it is highly likely that the operation of the electronic device 11 is stable. Therefore, the program that is used for executing control processing is switched to the updated control program P1 at an appropriate timing.

Note that, in the simplified program execution processing, the control unit 24 may also execute the simplified program P2 if it is determined that running of the vehicle 100 is stopped, and the charge amount of the battery 12 is at least the reference amount. When the conditions that running of the vehicle 100 is stopped, that the charge amount of the battery 12 is at least the reference amount, and that the tilt angle is at least the reference value are satisfied, the operation of the electronic device is most stable. However, in a configuration where there is no problem with the stability of the operation of the electronic device if the conditions that running of the vehicle 100 is stopped and the charge amount of the battery 12 is at least the reference amount are satisfied, the determination as to whether or not the tilt angle is at least the reference value may be omitted.

In addition, in the simplified program execution processing, the control unit 24 may also execute the simplified program P2 if it is determined that running of the vehicle 100 is stopped, and the tilt angle is smaller than the reference value. If the conditions that running of the vehicle 100 is stopped, that the charge amount of the battery 12 is at least the reference amount, and that the tilt angle is at least the reference value are satisfied, the operation of the electronic device is most stable. However, in a configuration where there is no problem with the stability of the operation of the electronic device if the conditions that running of the vehicle 100 is stopped and the tilt angle is smaller than the reference value are satisfied, the determination as to whether or not the charge amount of the battery 12 is at least the reference amount may be omitted.

Furthermore, in a configuration where there is no problem with the stability of the operation of the electronic device if the conditions that running of the vehicle 100 is stopped are satisfied, the control unit 24 may also execute the simplified program P2 if it is determined that running of the vehicle 100 is stopped, in the simplified program execution processing.

In addition, similarly to the conditions for executing the simplified program P2, the conditions for executing the control program P1 may be mitigated. Therefore, the control program P1 may also be executed when the conditions that running of the vehicle 100 is stopped and the charge amount of the battery 12 is at least the reference amount are satisfied. In addition, the control program P1 may also be executed when the conditions that running of the vehicle 100 is stopped and the tilt angle is smaller than the reference value are satisfied. Furthermore, the control program P1 may also be executed when running of the vehicle 100 is stopped.

Also, the control unit 24 may also execute one or both of the simplified program execution processing and the control program execution processing, regardless of whether or not the ignition switch 13 is off.

In addition, it suffices for the number of pieces of information that are used for the regular control processing, namely, N to be at least 2. It suffices for the number of pieces of information that are used for the simplified control processing, namely M is not limited to 1, and M may be any natural number smaller than N.

Furthermore, the regular control processing and the simplified control processing are not limited to processing for performing control related to activation and stop of the electronic device 11, and may be any processing for performing control related to the operation of the electronic device 11. If the electronic device 11 is, for example, a motor, the regular control processing and the simplified control processing may also be processing for controlling the rotation frequency of the motor. If the electronic device 11 is, for example, a lamp, the regular control processing and the simplified control processing may also be processing for adjusting the illuminance of the lamp.

The disclosed embodiments are to be considered as illustrative and non-limiting in all aspects. The scope of the present disclosure is indicated not by the above-stated meanings but by the claims, and is intended to include all modifications that are within the meanings and the scope that are equivalent to those of the claims.

The invention claimed is:

1. A processing apparatus for a vehicle provided with a control processing unit that executes control processing for controlling an operation of an electronic device by executing a first program, the processing apparatus comprising:
    an update determination unit that determines whether or not to update the first program;
    a stop determination unit that determines whether or not running of the vehicle is stopped if the update determination unit makes a determination to update the first program,
    wherein, if the stop determination unit determines that running of the vehicle is stopped, the control processing unit executes the control processing by executing a second program, and a data amount of the second program is smaller than a data amount of the first program; and an angle determination unit that, if the update determination unit makes a determination to update the first program, determines a tilt angle formed by a travel direction of the vehicle and a horizontal plane,
    wherein, if the stop determination unit determines that running of the vehicle is stopped, and the angle determination unit determines that the tilt angle is less than a predetermined value, the control processing unit executes the control processing by executing the second program.

2. The processing apparatus according to claim 1, further comprising:
    an update processing unit that, if the stop determination unit determines that running of the vehicle is stopped, executes update processing for updating the first program by executing the second program.

3. The processing apparatus according to claim 2,
    wherein the control processing unit executes the control processing that is based on N types of information (where N is an integer of at least 2) by executing the first program, and executes the control processing that is based on M types of information (where M is a natural number smaller than N) that are a subset of the N types of information by executing the second program.

4. The processing apparatus according to claim 2, further comprising:
a charge amount determination unit that, if the update determination unit makes a determination to update the first program, determines whether or not a charge amount of a battery mounted in the vehicle is at least a predetermined amount,
wherein, if the stop determination unit determines that running of the vehicle is stopped, and the charge amount determination unit determines that the charge amount is at least the predetermined amount, the control processing unit executes the control processing by executing the second program.

5. The processing apparatus according to claim 2, further comprising:
a completion determination unit that determines whether or not an update of the first program is complete; and
a second stop determination unit that, if the completion determination unit determines that the update is complete, determines whether or not running of the vehicle is stopped,
wherein, if the second stop determination unit determines that running of the vehicle is stopped, the control processing unit executes the control processing by executing the updated first program.

6. The processing apparatus according to claim 1, wherein the control processing unit executes the control processing that is based on N types of information (where N is an integer of at least 2) by executing the first program, and
executes the control processing that is based on M types of information (where M is a natural number smaller than N) that are a subset of the N types of information by executing the second program.

7. The processing apparatus according to claim 6, further comprising:
a charge amount determination unit that, if the update determination unit makes a determination to update the first program, determines whether or not a charge amount of a battery mounted in the vehicle is at least a predetermined amount,
wherein, if the stop determination unit determines that running of the vehicle is stopped, and the charge amount determination unit determines that the charge amount is at least the predetermined amount, the control processing unit executes the control processing by executing the second program.

8. The processing apparatus according to claim 6, further comprising:
a completion determination unit that determines whether or not an update of the first program is complete; and
a second stop determination unit that, if the completion determination unit determines that the update is complete, determines whether or not running of the vehicle is stopped,
wherein, if the second stop determination unit determines that running of the vehicle is stopped, the control processing unit executes the control processing by executing the updated first program.

9. The processing apparatus according to claim 1, further comprising:
a charge amount determination unit that, if the update determination unit makes a determination to update the first program, determines whether or not a charge amount of a battery mounted in the vehicle is at least a predetermined amount,
wherein, if the stop determination unit determines that running of the vehicle is stopped, and the charge amount determination unit determines that the charge amount is at least the predetermined amount, the control processing unit executes the control processing by executing the second program.

10. The processing apparatus according to claim 9, further comprising:
a completion determination unit that determines whether or not an update of the first program is complete; and
a second stop determination unit that, if the completion determination unit determines that the update is complete, determines whether or not running of the vehicle is stopped,
wherein, if the second stop determination unit determines that running of the vehicle is stopped, the control processing unit executes the control processing by executing the updated first program.

11. The processing apparatus according to claim 1, further comprising:
a completion determination unit that determines whether or not an update of the first program is complete; and
a second stop determination unit that, if the completion determination unit determines that the update is complete, determines whether or not running of the vehicle is stopped,
wherein, if the second stop determination unit determines that running of the vehicle is stopped, the control processing unit executes the control processing by executing the updated first program.

12. A processing method comprising:
a step of executing control processing for controlling an operation of an electronic device by executing a first program;
a step of determining whether or not to update the first program;
a step of determining whether or not running of a vehicle is stopped if a determination is made to update the first program;
a step of executing the control processing by executing a second program whose data amount is smaller than a data amount of the first program if it is determined that running of the vehicle is stopped; and
a step of determining a tilt angle formed by a travel direction of the vehicle and a horizontal plane if the first program is updated; and
a step of executing control processing by the second program if the running of the vehicle is stopped and the tilt angle is less than a predetermined value.

* * * * *